United States Patent Office 3,592,802
Patented July 13, 1971

3,592,802
POLYMERIZATION OF TETRAFLUOROETHYLENE
Lacey E. Scoggins and John E. Mahan, Bartlesville, Okla., assignors to Phillips Petroleum Company
No Drawing. Filed Nov. 25, 1968, Ser. No. 778,794
Int. Cl. C08f 3/24
U.S. Cl. 260—92.1                     10 Claims

ABSTRACT OF THE DISCLOSURE

Tetrafluoroethylene is polymerized in the presence of at least one di(saturated hydrocarbyl) peroxydicarbonate wherein the saturated hydrocarbyl radicals have from 1 to 4 carbon atoms.

This invention relates to a process for the polymerization of tetrafluoroethylene.

While a large group of organic peroxydicarbonates have been proposed for use as polymerization catalysts for vinyl compounds, including vinyl chloride and vinyl fluoride, it has been discovered that many of these organic peroxydicarbonates are not merely unsuitable but even inoperable for the polymerization of tetrafluoroethylene.

It is an object of the invention to provide an improved process for the polymerization of tetrafluoroethylene.

Other objects, aspects and advantages of the invention will be apparent from a study of the specification and the appended claims to the invention.

In accordance with the invention tetrafluoroethylene is contacted with at least one di(saturated hydrocarbyl) peroxydicarbonate under suitable polymerization conditions, each of the saturated hydrocarbyl radicals having from 1 to 4 carbon atoms and preferably having 3 or 4 carbon atoms.

The following examples are presented in illustration of the invention.

EXAMPLE I

In runs 1–7 diisopropyl peroxydicarbonate was dry mixed with finely divided particles of polytetrafluoroethylene (PTFE) at Dry Ice temperature. This mixture was placed in a cold (0° C.) 1-liter magnedrive autoclave equipped with anchor stirrer and internal cooling coils. The reactor was sealed and pressure checked with purified nitrogen at 400 p.s.i.g. The reactor was flushed four times by pressuring with purified nitrogen (400 p.s.i.g.) followed by evacuation after each pressuring cycle. After the last evacuation, uninhibited tetrafluoroethylene (TFE) was added to the reactor to achieve the desired reaction pressure. The inhibitor had been removed from the TFE by passing the TFE through a silica gel column at a rate of 1 liter/min./0.5 lb. of silica gel. The reactor was heated to the reaction temperature and held at this temperature by applying cooling when needed. A rapid pressure drop ensued at 60° C. and the monomer pressure was maintained at approximately the desired reaction pressure by adding TFE when the pressure dropped 20 p.s.i.g. below the desired reaction pressure. Near the end of each run, the pressure was allowed to drop. After the desired reaction time, the unreacted TFE was metered through a wet test meter. The dry polymer was removed from the reactor walls, cooling coils and head. Run 8 was conducted in the same manner except that the PTFE carrier particles were omitted and the IPP was introduced into the reactor with TFE. The reaction conditions and results of polymer evaluation are shown in Table I.

TABLE I

| Run | Initiator | G. | Carrier | G. | Time, min. | Temp., °C. | Pressure range, p.s.i.g. | Yield, g. PTFE/g. initiator | Conversion, percent | Sintering [1] 380° C. density ½ hr. | 2 hrs. | TII [2] |
|---|---|---|---|---|---|---|---|---|---|---|---|---|
| 1 | IPP [3] | 0.03 | PTFE | 30 | 125 | 64 | 100–200 | 7,000 | 79 | 2.205 | 2.204 | −1 |
| 2 | IPP | .006 | PTFE | 5 | 250 | 66 | 90–195 | 11,333 | 72 | 2.261 | 2.193 | −67 |
| 3 | IPP | 0.012 | PTFE | 13 | 175 | 63 | 100–250 | 15,820 | 92 | 2.265 | 2.279 | +14 |
| 4 | IPP | 0.0085 | PTFE | 20 | 367 | 70 | 100–210 | 14,500 | 79 | 2.266 | 2.269 | +3 |
| 5 | IPP | 0.0085 | PTFE | 10 | 240 | 70 | 100–195 | 7,240 | 60 | 2.253 | 2.260 | +7 |
| 6 | IPP | 0.02 | PTFE | 10 | 126 | 93 | 75–145 | 5,405 | 84 | 2.269 | 2.271 | +2 |
| 7 | IPP | .01 | PTFE | 10 | 60 | 92 | 150–190 | 11,220 | 70 | 2.269 | 2.271 | +2 |
| 8 | IPP | .01 | ([4]) | | 150 | 85 | 150–220 | 5,720 | 53 | 2.273 | 2.287 | +14 |

[1] Sintering technique has ASTM designation D 1457-62T.
[2] TII = Thermal instability index = density 2 hr. − density ½ hr. × 1,000.
[3] IPP = Diisopropyl peroxydicarbonate.
[4] None.

EXAMPLE II

A run was conducted utilizing the procedure of run 8 of Example I except for the introduction of 0.008 gram of di(sec-butyl) peroxydicarbonate into the reactor at room temperature instead of IPP. The reactor was heated to 65–71° C. with the TFE pressure maintained in the range of 165–240 p.s.i.g. for 162 minutes, resulting in 3100 grams of PTFE per gram of initiator and a conversion of 39 percent. The sintering 380° C. density values were 2.270 and 2.247 for ½ hour and 2 hours, respectively, for a TII of −23.

EXAMPLE III

A run was conducted utilizing the procedure of runs 1–7 of Example I except for the use of 0.02 gram of dicyclohexyl peroxydicarbonate admixed with 20 grams of PTFE carrier particles instead of the IPP and PTFE particles. With 88 minutes at 60–85° C. and 140–150 p.s.i.g., no polymerization had occurred. The TFE was then vented, after which 0.01 gram of IPP was injected and the reactor repressured to 130 p.s.i.g. with TFE. Polymerization occurred upon heating to 70° C. A pressure of 130–200 p.s.i.g. of TFE was maintained for 105 minutes, resulting in 6980 grams of PTFE per gram of initiator and 55 percent conversion.

EXAMPLE IV

A run was conducted with the procedure of runs 1–7 of Example I except for the use of 0.016 gram of di(2-ethylhexyl) peroxydicarbonate admixed with 20 grams of PTFE carrier particles instead of the admixture of IPP and carrier. The reactor was maintained at 51–72° C. and 140–180 p.s.i.g. TFE for 103 minutes, but no polymerization occurred. The reactor was then cooled, vented, and a second charge of 0.016 gram of di(2-ethylhexyl) peroxydicarbonate was injected. The reactor was repressured to 160 p.s.i.g. TFE and maintained at a temperature of 55–73° C. for 58 minutes, but no polymerization occurred.

Thus, the runs utilizing diisopropyl peroxydicarbonate or di(sec-butyl) peroxydicarbonate resulted in polymerization of the TFE with satisfactory yields, while the runs utilizing dicyclohexyl peroxydicarborate or di(2-ethylhexyl) peroxydicarbonate did not achieve any detectable polymerization whatever under the conditions employed. The reason why some organic peroxydicarbonates are suitable catalysts for tetrafluoroethylene and others are completely inoperable is not known. The polymer produced in the examples is generally comparable to commercially available polytetrafluoroethylene products, and can be employed in the conventional uses of polytetrafluoroethylene, for example, films, coating or impregnating textiles, glass fabric, ceramics, metals or wood, molding of shaped articles, wire coating, and the like.

The initiators of the invention are the di(saturated hydrocarbyl) peroxydicarbonates wherein the saturated hydrocarbyl contains from 1 to 4 carbon atoms. This includes dimethyl peroxydicarbonate, diethyl peroxydicarbonate, dipropyl peroxydicarbonate, diisopropyl peroxydicarbonate, dicyclopropyl peroxydicarbonate, dibutyl peroxydicarbonate, diisobutyl peroxydicarbonate, di(sec-butyl) peroxydicarbonate, di(tert-butyl) peroxydicarbonate, dicyclobutyl peroxydicarbonate, methyl ethyl peroxydicarborate, ethyl isopropyl peroxydicarborate, methyl butyl peroxydicarbonate, and ethyl propyl peroxydicarbonate, and mixtures thereof. The preferred saturated hydrocarbyl radicals are the acyclic alkyls having from 1 to 4 carbon atoms and more preferably 3 or 4 carbon atoms.

It is desirable that the tetrafluoroethylene be in the vapor phase when it is contacted with the initiator in order to permit control of the reaction which otherwise could be hazardous. The reaction temperature will generally be in the range of about 40 to about 120° C., preferably in the range of about 60 to about 100° C., while the reaction pressure will generally be in the range of about 0 to about 1000 p.s.i.g., preferably in the range of about 100 to about 300 p.s.i.g. The reaction will generally be conducted for a time in the range of about 1 minute to about 50 hours, preferably in the range of about 30 minutes to about 10 hours. The weight ratio of initiator to monomer will generally be in the range of about 1:2000 to about 1:40,000, preferably in the range of about 1:5000 to about 1:30,000. While the initiator can be utilized without a carrier, it is advantageous to deposit the initiator on finely divided particles of polytetrafluoroethylene or other suitable carrier, and employ a fluidized bed reactor. The size of the carrier particles will generally be in the range of about 100 to about 400 mesh (Tyler).

Reasonable variations and modifications are possible within the scope of the foregoing disclosure and the appended claims to the invention.

I claim:
1. A process for the bulk polymerization of tetrafluoroethylene which comprises contacting the tetrafluoroethylene under suitable bulk polymerization reaction conditions with at least one di(saturated hydrocarbyl) peroxydicarbonate, wherein the saturated hydrocarbyl radicals have from 1 to 4 carbon atoms, said reaction conditions comprise a temperature in the range of about 40° to about 120° C., and a ratio of said at least one di(saturated hydrocarbyl) peroxydicarbonate to tetrafluoroethylene in the range of about 1:2,000 to about 1:40,000.

2. A process in accordance with claim 1 further comprising recovering the resulting polymer.

3. A process in accordance with claim 2 wherein said reaction conditions further comprise a reaction pressure in the range of about 0 to about 1000 p.s.i.g., and a time in the range of about 1 minute to about 50 hours.

4. A process in accordance with claim 2 wherein said reaction conditions comprise a temperature in the range of about 60 to about 100° C., a pressure in the range of about 100 to about 300 p.s.i.g., and a time in the range of about 30 minutes to about 10 hours, and the ratio of said at least one di(saturated hydrocarbyl) peroxydicarbonate to tetrafluoroethylene is in the range of about 1:5000 to about 1:30,000.

5. A process in accordance with claim 2 wherein said saturated hydrocarbyl radical is an alkyl radical having from 1 to 4 carbon atoms.

6. A process in accordance with claim 2 wherein said saturated hydrocarbyl radical has 3 or 4 carbon atoms.

7. A process in accordance with claim 2 wherein said saturated hydrocarbyl radical is isopropyl.

8. A process in accordance with claim 2 wherein said saturated hydrocarbyl radical is sec-butyl.

9. A process in accordance with claim 2 wherein said at least one di(saturated hydrocarbyl) peroxydicarbonate is supported on a carrier.

10. A process in accordance with claim 9 wherein said carrier comprises particles of polytetrafluoroethylene having a particle size in the range of about 100 to about 400 mesh (Tyler).

References Cited
UNITED STATES PATENTS

| | | | |
|---|---|---|---|
| 2,464,062 | 3/1949 | Strain | 260—92.1 |
| 2,965,595 | 12/1960 | Brinker et al. | 260—92.1 |
| 3,022,281 | 2/1962 | Smith | 260—92.1 |
| 3,413,277 | 11/1968 | Crano et al. | 260—85.5F |
| 3,432,484 | 3/1969 | Welch | 260—85.5F |
| 3,475,306 | 10/1969 | Clocker | 260—92.1 |

HARRY WONG, Jr., Primary Examiner

U.S. Cl. X.R.

117—123, 124, 128.4, 132, 138.5, 138.8, 139.5, 148